United States Patent
Chen et al.

(10) Patent No.: US 7,485,367 B2
(45) Date of Patent: Feb. 3, 2009

(54) CACO$_3$/SIO$_2$.NH$_2$O NANOCOMPOSITE PARTICLES AND SIO$_2$.NH$_2$O HOLLOW-STRUCTURES NANOMATERIALS AND SYNTHESIZING METHOD

(75) Inventors: Jianfeng Chen, Beijing (CN); Runjing Liu, Beijing (CN); Yun Jimmy, Beijing (CN); Zhigang Shen, Beijing (CN); Haikui Zou, Beijing (CN); Fen Guo, Beijing (CN)

(73) Assignees: Beijing University of Chemical Technology, Beijing (CN); Nanomaterials Technology PTE Ltd., Singapore (SG)

( * ) Notice: Subject to any disclaimer, the term of this patent is extended or adjusted under 35 U.S.C. 154(b) by 440 days.

(21) Appl. No.: 10/945,299

(22) Filed: Sep. 20, 2004

(65) Prior Publication Data

US 2005/0170178 A1      Aug. 4, 2005

Related U.S. Application Data

(63) Continuation-in-part of application No. PCT/CN03/00205, filed on Mar. 20, 2003.

(30) Foreign Application Priority Data

Mar. 20, 2002   (CN) ............................. 02 1 07391

(51) Int. Cl.
  *B32B 5/16* (2006.01)
  *B05D 7/00* (2006.01)
(52) U.S. Cl. .................. 428/403; 427/215; 427/219
(58) Field of Classification Search ................ 428/403, 428/404, 405, 406; 427/215, 219
See application file for complete search history.

(56) References Cited

U.S. PATENT DOCUMENTS

| | | | | |
|---|---|---|---|---|
| 5,958,367 A | * | 9/1999 | Ying et al. | 423/701 |
| 6,326,326 B1 | * | 12/2001 | Feng et al. | 502/62 |
| 6,528,034 B1 | * | 3/2003 | Pinnavaia et al. | 423/335 |
| 6,669,924 B1 | * | 12/2003 | Kaliaguine et al. | 423/702 |
| 6,696,258 B1 | * | 2/2004 | Wei et al. | 435/7.2 |
| 6,926,882 B2 | * | 8/2005 | Sterte et al. | 423/716 |
| 7,018,596 B2 | * | 3/2006 | Satou et al. | 423/335 |
| 2003/0157248 A1 | * | 8/2003 | Watkins et al. | 427/256 |
| 2005/0244322 A1 | * | 11/2005 | Chen et al. | 423/335 |

FOREIGN PATENT DOCUMENTS

CN       1183379 A      6/1998

(Continued)

OTHER PUBLICATIONS

Jie-Xin Wang, et al., "Needle-like calcium carbonate assisted self-assembly of mesotructured hollow silica nanotubes", J. of Solid State chemistry, 178 (2005) 2383-2389.*

(Continued)

*Primary Examiner*—H. T Le
(74) *Attorney, Agent, or Firm*—Townsend and Townsend and Crew LLP

(57) ABSTRACT

The invention provides CaCO$_3$/SiO$_2$.nH$_2$O nanocomposite particles and method of producing the same. A template nucleus is used calcium carbonate and the surface of nucleus is encapsulated by a SiO$_2$.nH$_2$O nanolayer. The invention also provides a CaCO$_3$/SiO$_2$.nH$_2$O nanocomposite particles having hollow structure, in which n=0-2. The nanocomposite particles according to the invention have a number of uses.

15 Claims, 3 Drawing Sheets

FOREIGN PATENT DOCUMENTS

CN          1377921 A    11/2002

OTHER PUBLICATIONS

Qing-Gui Xiao et al., "Silica Nanotubes Based on Needle-like Calcium Carbonate: Fabrication and Immobilization for Glucose Oxidase", Key Lab for Nanomaterials of the Ministry of Education, China, Web publication date Dec. 15, 2006.*

Chen et al., "Synthesis of porous silica structures with hollow interiors by templating nanosized calcium carbonate", Inorganic Chemistry Communications, 7 (2004) 447-449.*

Beck J. S. et al, J. Am. Chem. Soc. 1992, 114: 10834-10843.

* cited by examiner

CACO₃/SIO₂.NH₂O NANOCOMPOSITE PARTICLES AND SIO₂.NH₂O HOLLOW-STRUCTURES NANOMATERIALS AND SYNTHESIZING METHOD

CROSS REFERENCE TO RELATED APPLICATIONS

This is a continuation-in-part of International Application PCT/CN03/00205, with an international filing date of Mar. 20, 2003.

FIELD OF THE INVENTION

The present invention relates to $CaCO_3/SiO_2.nH_2O$ nanocomposite particles and their preparation methods. More specifically, the present invention relates to $CaCO_3/SiO_2.nH_2O$ nanocomposite particles with core-shell structures prepared via a coating layer of $SiO_2.nH_2O$ on the surface of $CaCO_3$ templated cores with different diameters and morphologies. The present invention also relates to the preparation of $SiO_2.nH_2O$ hollow structures with different diameters and morphologies based on $CaCO_3/SiO_2.nH_2O$ nanocomposite particles. The present invention also relates to the preparation of mesoporous materials via $SiO_2.nH_2O$ coating layer of $CaCO_3/SiO_2.nH_2O$ nanocomposite particles, and further obtaining $SiO_2.nH_2O$ mesoporous materials with hollow structures.

BACKGROUND OF THE INVENTION

Nanocomposite materials exhibit many properties that are substantially different from those of the templated cores, such as different surface composition, magnetic properties, optical properties, high stability, and so on. As advanced composite functional materials with new properties, they have been found in extensive applications in many fields, such as microelectronics, communication, automobile, aerospace, defense, chemical, metallurgical, mechanical, biologic, pharmaceutical and optical industries. With the development of modern technology, the demands for materials having specialized properties are enhanced increasingly. Materials with only one component can hardly meet these requirements, while nanocomposite particles with core-shell structure have the feature of designability. Advanced composite particles with new properties can be created by utilizing multi-composite and nonlinear composite effects.

As one of important inorganic fillers, calcium carbonate is widely used in many fields, such as rubber, plastic, paint, printing ink, coating, paper, toothpaste and cosmetic and the like. Owing to its surface hydrophilia and oleophobic properties, calcium carbonate has a poor affinity with organic high polymer and bad dispersion in high polymer, which causes defects in the interface of two materials, thereby decreasing mechanical properties of composite materials. In order to improve its application performance, calcium carbonate needs surface modification. Previously, surface modifications for calcium carbonate focus on organic modifications, which are classified into two types: (1) Treatment with surfactants. The surface of calcium carbonate is treated with anionic, cationic and nonionic surfactants, such as fatty acids, esters, alcohols and acidamides. These substances tend to form a coating layer on the surface of calcium carbonate to make it compatible with polymers, and thereby improving the mechanical behaviors of the materials. (2) Treatment with coupling agents. At present, the surface modification for calcium carbonate with coupling agents is a fastest-developed modification technique. There are usually several kinds of groups with different properties and functions in coupling agent molecules. Some of them can react with various groups on the surfaces of the fillers to form chemical bonds, while others can physically wrap around the surface or react with polymer macromolecules. Coupling agents in themselves should have longer flexible hydrocarbon chains, which favor to enhance the stress at the interface layer and to improve the ability of the interface layer to absorb or scatter impact energy, and thereby enhancing over-all properties of materials. There are various kinds of coupling agents, such as silicon, titanium, aluminum, chromium, zirconium, and zinc series.

Silica ($SiO_2.nH_2O$) is a good reinforcing white filler for rubber. There are two reasons as follows: (1) there are large quantities of silanol groups having affinity with rubber, plastic and fiber on the surfaces of silica particles, which can cause polymers to form linkage with $SiO_2.nH_2O$ particles; and (2) $SiO_2.nH_2O$ particles have large surface areas and abundant chain structures. Industrial superfine calcium carbonate with best quality has a BET surface area $\geq 26$ m²/g. Therefore, polymers have larger contact area with silica particles than with calcium carbonate, which benefits to form linkage at the interface of two materials, thereby improving mechanical properties of materials. However, it is very necessary to develop the inexpensive products to partly or completely replace silica due to the higher price of $SiO_2.nH_2O$.

Hua et al. had microcrystal analysis XRD and XPS studies for $SiO_2$-coated $CaCO_3$ superfine particles, indicating that the $SiO_2$-coated superfine $CaCO_3$ has a particle size of about 130 nm. See Hua Y. M. et al, Chin. J. Inorg. Chem., 2001, 17(1): 135-138. However, the particle size doesn't meet the requirement of nanomaterials. Furthermore, there is no report on composite particles of calcium carbonate coated by other components.

Owing to their large BET surface areas and absorbing capacity, inorganic porous materials have been widely used as catalysts and absorption materials. According to different pore sizes, porous materials can be classified into microporous materials, mesoporous materials, or macroporous materials. In general, microporous materials have pore diameters of 2 nm or less, mesoporous materials have pore diameters of 2 to 50 nm, and macroporous materials have pore diameters of 50 nm or more. However, mesoporous materials have the disadvantages of irregular pores and wide-distribution dimensions. See Beck J. S. et al, J. Am. Chem. Soc. 1992, 114: 10834-10843. In addition, the preparation method for mesoporous materials usually involves a complicated procedure and a high cost, while a method with low cost and facile process is preferred.

Therefore, one object of the present invention is to provide composite materials of $CaCO_3$ and $SiO_2.nH_2O$.

Another object of the present invention is to provide $SiO_2.nH_2O$ materials with hollow structures.

A further object of the present invention is to provide $SiO_2.nH_2O$ mesoporous nanomaterials with hollow structures.

A still further object of the present invention is to provide a preparation method for the above-mentioned composite materials and mesoporous materials.

SUMMARY OF THE INVENTION

The present invention relates to $CaCO_3/SiO_2.nH_2O$ composite particles with core-shell structures, wherein $CaCO_3$ is the templated core, $SiO_2.nH_2O$ is the coating layer, and n=0-2.

The present invention also relates to the preparation of $SiO_2 \cdot nH_2O$ materials with hollow structures based on the above-mentioned $CaCO_3/SiO_2 \cdot nH_2O$ composite materials, where n=0-2.

The present invention also relates to the preparation of $SiO_2 \cdot nH_2O$ mesoporous materials with hollow structures based on the above-mentioned $CaCO_3/SiO_2 \cdot nH_2O$ composite materials, where n=0-2.

The present invention also relates to the preparation method for the above-mentioned $CaCO_3/SiO_2 \cdot nH_2O$ composite materials. The preparation method encompasses the following: the calcium carbonate aqueous suspension was mixed with aqueous solution containing silicon or organic compound containing silicon in a reaction vessel. The mixture was continuously stirred at a controlled desired temperature and pH. After silicon was precipitated completely, the system was aged for a period of time, and then filtered, washed, dried to obtain $CaCO_3/SiO_2 \cdot nH_2O$ nanocomposite particles.

The present invention also relates to the preparation method for $CaCO_3/SiO_2 \cdot nH_2O$ mesoporous composite materials. A desired amount of template agents and aqueous solution containing silicon or organic compound containing silicon were added into the calcium carbonate suspension, so as to be mixed in a reaction vessel. The mixture was continuously stirred at a controlled desired temperature and pH, aged for a period of time, and then filtered, washed, dried, and calcinated in air to obtain $CaCO_3/SiO_2 \cdot nH_2O$ nanocomposite particles with a mesoporous $SiO_2 \cdot nH_2O$ coating layer.

The present invention also relates to the preparation method for $SiO_2 \cdot nH_2O$ mesoporous materials. The $CaCO_3/SiO_2 \cdot nH_2O$ nanocomposite particles of the present invention were calcinated, dissolved in an acid solution, filtered, washed and dried to obtain $SiO_2 \cdot nH_2O$ mesoporous nanomaterials with hollow structures.

The present invention also relates to the applications of the above-mentioned composite materials and mesoporous materials in various fields, such as microelectronics, communication, automobile, aerospace, defense, chemical, metallurgical, mechanical, biologic, pharmaceutical, optical and building materials industries.

DETAILED DESCRIPTION OF THE INVENTION

Figure 2:
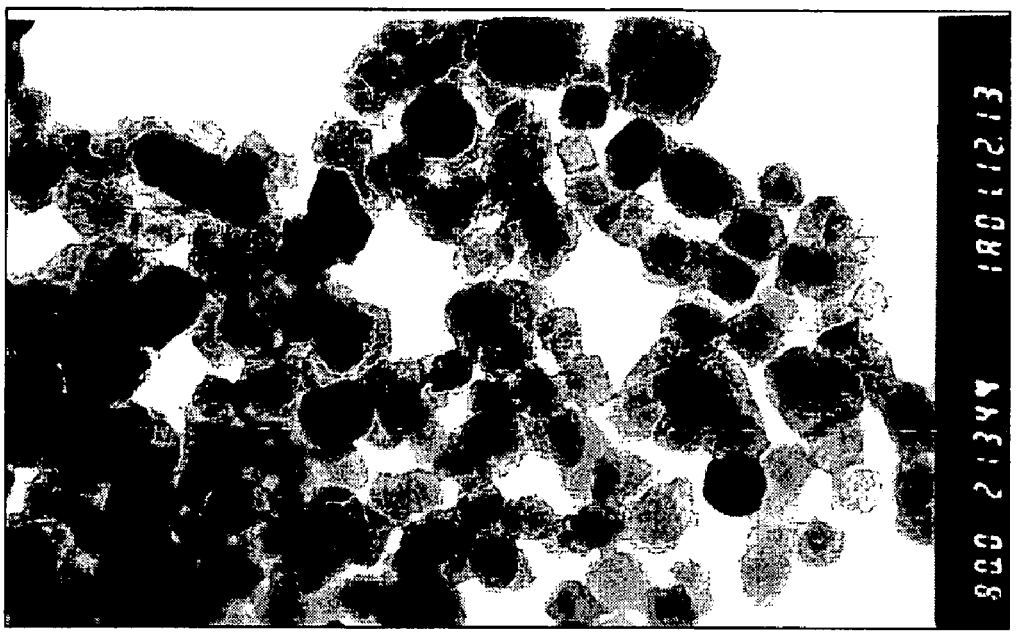
FIG. 2 is TEM image of CaCO3/SiO2 nanocomposite particles in the present invention.
Figure 1:
FIG. 1 is transmission electron microscopy (TEM) image of original CaCO3 nanoparticles.
Figure 4:
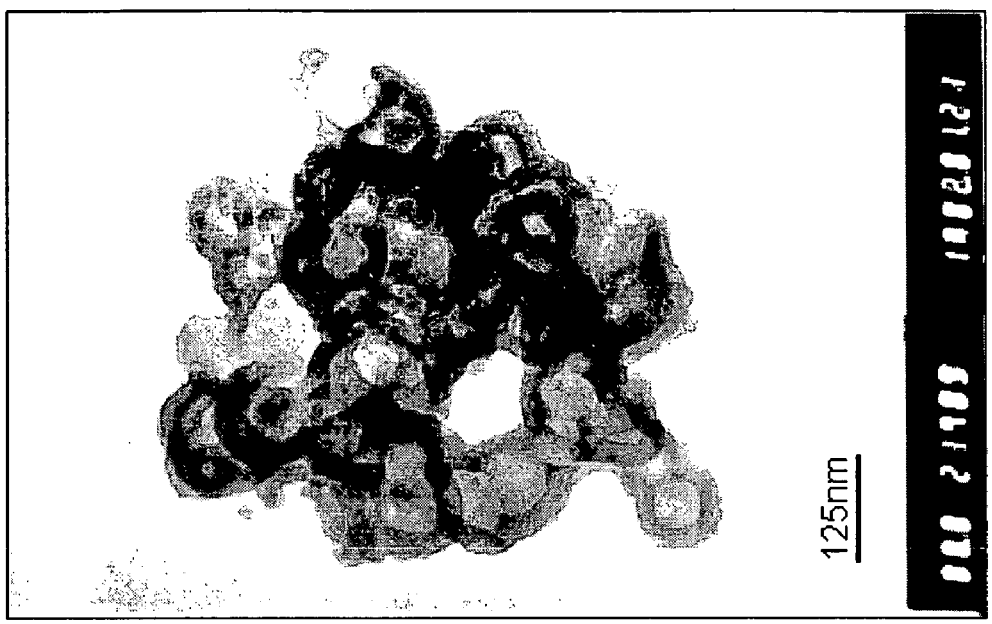
FIG. 4 is TEM image of silica mesoporous materials with hollow structures of the present invention.
Figure 3:
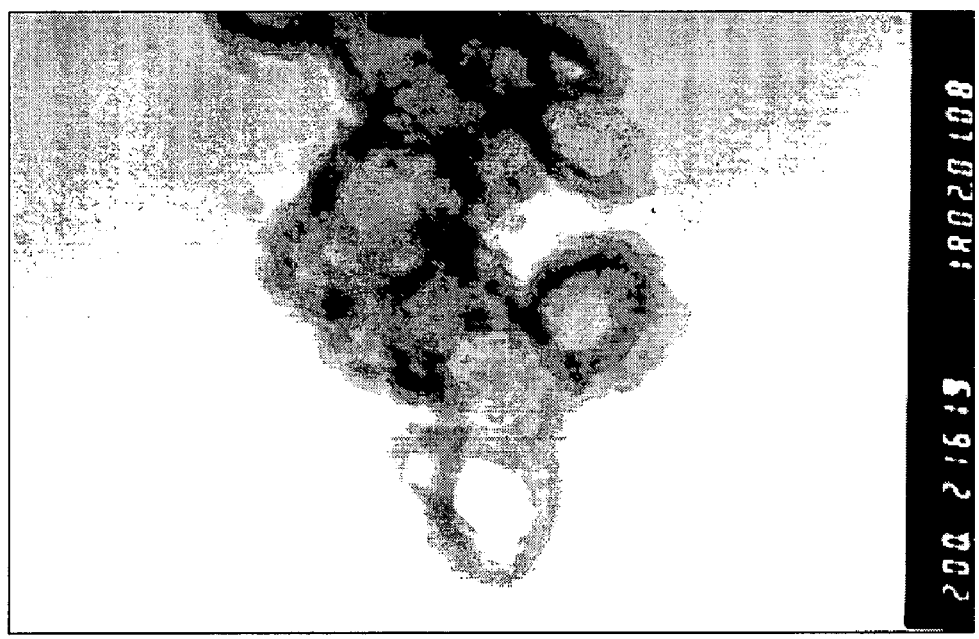
FIG. 3 is TEM image of hollow spheres silica of the present invention.
Figure 6:
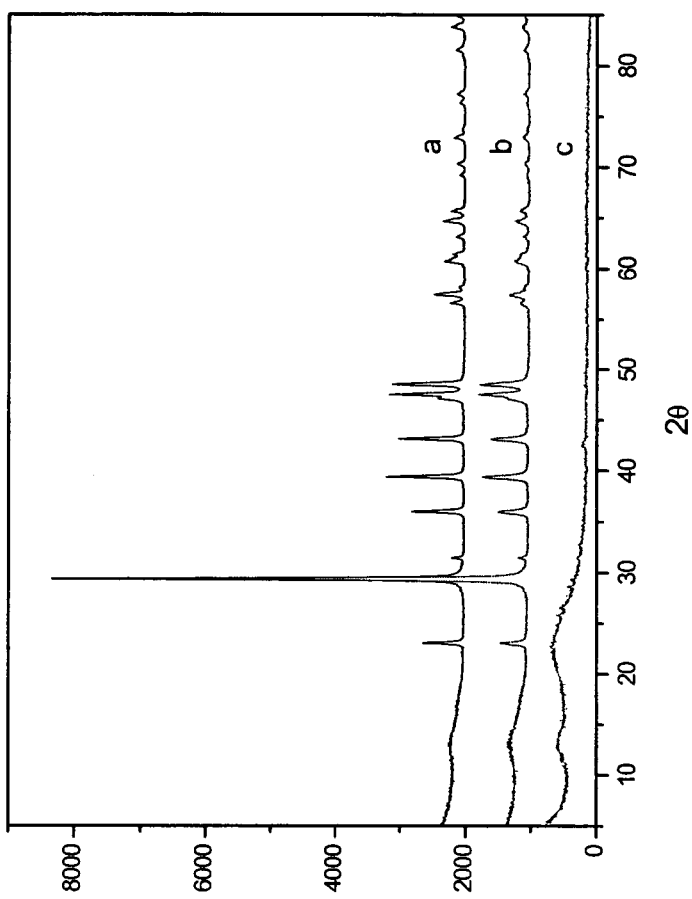
FIG. 6 is (a) powder X-ray diffraction (XRD) patterns of nanometer $CaCO_3$, (b) $CaCO_3/SiO_2 \cdot nH_2O$ nanocomposite particles, and (c) nanometer silica hollow spheres.
Figure 5:
FIG. 5 is TEM image of silica mesoporous materials with fibrous hollow structures of the present invention.

The present invention provides $CaCO_3/SiO_2 \cdot nH_2O$ composite particles with core-shell structures, wherein $CaCO_3$ is the templated core and $SiO_2 \cdot nH_2O$ is the coating layer, and n=0-2. $CaCO_3/SiO_2 \cdot nH_2O$ composite particles of the present invention can be classified into needle, spherical, cubic, spindle, petal-like, chaining, laminar and fiber shape particles. Preferred $CaCO_3/SiO_2 \cdot nH_2O$ composite particles of the present invention are nanostructure particles with the average diameter $\leqq 100$ nm, preferably nanoparticles with the average diameter $\leqq 40$ nm, and more preferably nanoparticles with the average diameter $\leqq 35$ nm.

$CaCO_3/SiO_2 \cdot nH_2O$ composite materials of the present invention have mesoporous structures, and their preferred pore size distributions are 1-3 nm, 3-6 nm, 6-10 nm, or 1-10 nm.

The present invention provides a preparation method for $CaCO_3/SiO_2 \cdot nH_2O$ composite materials. The above-mentioned composite materials have core-shell structures, wherein $CaCO_3$ is the templated core, $SiO_2 \cdot nH_2O$ is the coating layer, n=0-2. The calcium carbonate aqueous suspension was mixed with aqueous solution containing silicon or organic compound containing silicon in the reactor. The mixture was continuously stirred at a controlled desired temperature and pH. After silicon was precipitated completely, the system was aged for a period of time, and then filtered, washed and dried to obtain $CaCO_3/SiO_2 \cdot nH_2O$ composite particles.

Calcium carbonate used as a template in the present invention includes ordinary calcium carbonate with a particle size larger than 5 μm, calcium carbonate with a particle size between larger than 1 μm and less than or equal to 5 μm, superfine calcium carbonate with a particle size between larger than 0.1 μm and less than or equal to 1 μm, and nanometer calcium carbonate with a particle size of 0.1 μm or less. The above-mentioned calcium carbonate can be needle, spherical, cubic, spindle, petal-like, chaining, laminar and fiber shape particles. The shape of calcium carbonate determines the shape of the final products.

The solutions containing silicon used in the present invention can be water soluble silicate such as $Na_2SiO_3$, $K_2SiO_3$, and organosilicate, such as ethyl orthosilicate (TEOS) and the like, which can hydrolyze into silica.

The reaction temperature is 10-100° C., preferably is 35-85° C., and more preferably is 40-80° C. The pH value of the reaction system is 10-12, preferably is 10.2-11.8, and more preferably is 10.5-11.5. The reaction time is 0.1-8 h, preferably is 1-6 h and more preferably is 2-4 h. The aging time is 0-6 h, preferably is 1-5 h, and more preferably is 2-3 h.

The reagents adjusting the pH can be sulfuric acid, hydrochloric acid, nitric acid, acetic acid and their mixture, carbon dioxide, and/or sodium hydroxide, potassium hydroxide, carbamide, ammonium bicarbonate, aqueous ammonia and ammonium chloride and the like.

According to one method of the present invention, in the preparation for $CaCO_3/SiO_2 \cdot nH_2O$ nanocomposite particles, one of the feeding modes is that the $CaCO_3$ suspension and the solution containing silicon are simultaneously added into the reactor, and then acid or alkali is added gradually into the mixture to adjust the pH of the mixture to a desired value. The other mode is that the solution containing silicon is then added into the $CaCO_3$ suspension, while the system is maintained at a desired pH value by simultaneously adding acid or alkali.

The present invention also provides a preparation method for $CaCO_3/SiO_2 \cdot nH_2O$ mesoporous composite materials. A desired amount of template agents and aqueous solution containing silicon or organic compound containing silicon were added into the calcium carbonate suspension, so as to be mixed in the reactor. A desired temperature and pH were controlled. After a desired amount of templating agent was mixed with aqueous solution containing silicon or organic compound containing silicon in the reactor, at a controlled temperature and pH, calcium carbonate suspension was added into the above mixture. Then the mixture was continuously stirred and aged for a period of time, filtered, washed and dried to obtain $CaCO_3/SiO_2 \cdot nH_2O$ nanocomposite particles with mesoporous $SiO_2 \cdot nH_2O$ coating layer. The prepared nanocomposite particles were further calcinated to remove the templating agent.

In the preparation for $CaCO_3/SiO_2 \cdot nH_2O$ mesoporous composite materials, the above-mentioned templating agent is a long-chain alkyl quaternary ammnonium salt type cationic surfactant with low molecular weight including $C_nH_{2n+1}NMe_3X$, wherein n=10-22, and X=$Br^-$, $Cl^-$ or $OH^-$; surfactants with multi-function groups including $NH_2(CH_2)_nNH_2$, wherein n=10-22; surfactants with high molecular weight including PEO—PPO—PEO; nonionic Gemini surfactants or their mixture. The concrete examples include as follows:

In the preparation for $CaCO_3/SiO_2 \cdot nH_2O$ mesoporous composite materials, calcium carbonate used as template includes ordinary calcium carbonate with a particle size larger than 5 μm, calcium carbonate with a particle size between larger than 1 μm and less than or equal to 5 μm, superfine calcium carbonate with a particle size between larger than 0.1 μm and less than or equal to 1 μm, and nanometer calcium carbonate with a particle size of 0.1 μm or less. The above-mentioned calcium carbonate can be needle, spherical, cubic, spindle, chaining, fiber, petal-like and laminar calcium carbonate.

In the preparation for $CaCO_3/SiO_2 \cdot nH_2O$ mesoporous composite materials, the reaction temperature is 10-200° C., preferably is 35-185° C. and more preferably is 40-150° C. The pH value of the reaction system is 10-12, preferably is 10.2-11.8, and more preferably is 10.5-11.5. The reaction time is 0.1-8 h, preferably is 1-6 h, and more preferably is 2-4 h. The aging time is 0-6 h, preferably is 1-5 h, and more preferably is 2-3 h.

The reagents adjusting the pH can be sulfuric acid, hydrochloric acid, nitric acid, acetic acid and their mixture, carbon dioxide, and/or sodium hydroxide, potassium hydroxide, carbamide, ammonium bicarbonate, aqueous ammonia and ammonium chloride and the like.

The present invention also provides $SiO_2 \cdot nH_2O$ nanomaterials with hollow structures. Their shapes are needle, spherical, cubic, spindle, chaining, fiber, petal-like and laminar. The above-mentioned $SiO_2 \cdot nH_2O$ nanomaterials with hollow structures have a BET surface area of 50-1500 $m^2/g$ and preferably 100-1300 $m^2/g$, a pore volume of 0.01-10 ml/g, and a pore size distribution of 1-3 nm, 3-6 nm, 6-10 nm, or 1-15 nm. The above-mentioned nanomaterials are composed of noncrystalline or crystalline materials. The preferred $SiO_2 \cdot nH_2O$ nanomaterials are mesoporous materials.

The present invention also provides the preparation method of above $SiO_2 \cdot nH_2O$ (mesoporous) nanomaterials. $CaCO_3/SiO_2 \cdot nH_2O$ (mesoporous) nanocomposite particles were calcinated, dissolved in an acid solution, filtered, washed and dried to obtain mesoporous nanomaterials with hollow structures. In particular, the present invention provides a preparation method of $SiO_2 \cdot nH_2O$ nanometer hollow structures. The method comprises the following steps: a calcium carbonate aqueous suspension was mixed with aqueous solution containing silicon or organic compound containing silicon in the reactor. The temperature and pH were controlled, and the reaction mixture was continuously stirred. After silicon was precipitated completely, the system was aged for a period of time, and then filtered, washed and dried to obtain $CaCO_3/SiO_2 \cdot nH_2O$ nanocomposite particles. Thereafter the nanocomposite particles were calcinated and dissolved in an acid solution to remove calcium carbonate or calcium oxide to obtain $SiO_2 \cdot nH_2O$ nanometer hollow structures.

The present invention provides another method for preparing $SiO_2 \cdot nH_2O$ nanometer mesoporous hollow structures through the following steps: a desired amount of templating agents and aqueous solution containing silicon or organic compound containing silicon were added into the calcium carbonate suspension, so as to be mixed in the reactor. A desired temperature and pH were controlled, and the reaction mixture was continuously stirred, aged for a period of time, and then filtered, washed and dried to obtain $CaCO_3/SiO_2 \cdot nH_2O$ nanocomposite particles with mesoporous $SiO_2 \cdot nH_2O$ coating layer. Finally, the nanocomposite particles were calcinated, dissolved in an acid solution, filtered, washed and dried to obtain mesoporous nanomaterials with hollow structures.

The calcination temperature of the method is 200-1200° C., preferably is 450-1000° C., and more preferably is 500-900° C. The calcination time is 0.5-100 h, preferably is 2-30 h, and more preferably is 10-24 h. The acid solutions are sulfuric acid, hydrochloric acid, nitric acid, acetic acid and their mixture.

The nanocomposite particles are calcinated and dissolved in an acid solution to obtain nanomaterials with hollow structures. Owing to their high BET surface area and uniform pore size distribution, the materials can act as absorption materials, catalyst materials, wave-absorbing materials, thermal insulation materials, ceramic materials, sensitized materials, nanopigments, protectors of sensitive medium such as enzymes and proteins, materials for drug controlled-release, and templating agents for synthesis of one or zero dimension materials.

The $CaCO_3/SiO_2 \cdot nH_2O$ composite materials of the present invention combine the inexpensiveness of calcium carbonate with the excellent reinforcing performance of silica. All kinds of performance tests indicate that the nanocomposite materials are indeed optimized materials. They have both physical twining effects produced by fine particles and branch structures, and chemical bonding effects arising from surface activity. Thus, the nanocomposite materials of the present invention exhibit good reinforcing effects as filler for polymers. As their reinforcing performances correspond to those of silica, the nanocomposite particles can completely or mostly replace carbon black and silica as reinforcing filler. Furthermore, they have a large loading level and good reinforcing effects. The composite materials made of calcium carbonate with large particle diameter have good whitening effects, while those made of calcium carbonate with a particle diameter smaller than 100 nm are subtransparent and transparent, which provides a wider chosen range for the preparation of light colour rubber products.

Application experiments indicate that the $CaCO_3/SiO_2 \cdot nH_2O$ nanocomposite particles, which are made of calcium carbonate with a particle diameter of 30-40 nm or so, are added into the ethylene propylenediene elastomer waterproof materials, when additional amount reaches 40 shares, compared with those of the fatty acid modified nanometer calcium carbonate with the same particle diameter, the tensile strength and the tearing strength of the coil materials can be improved 3-5 times and 2-3 times, respectively, and the materials have the good ability of aging resistance. Their tensile and tear resistance performances correspond to those of ethylene propylenediene elastomer added 40 shares of silica. However, their hardness are a better indication of the practical requirement than that of materials added silica of Shao type A (50-55 shares), and their milling is easier than that of silica. If natural rubber, butadiene-styrene rubber, cis-polybutadiee rubber are combined to used, when addition amount reaches 60 shares, their tensile, tear resistance and wear resistant performance correspond to those of materials added the same amount of silica. Angular fatigue performance tests indicate that when $CaCO_3/SiO_2.nH_2O$ nanocomposite particles are added, the materials are not destroyed under a pressure of two hundred thousand times, while the materials crack under a pressure of one hundred and fifty thousand times when silica is added. Therefore, their angular fatigue performance is better than that of silica white.

As stated above, the present invention provides $SiO_2.nH_2O$ particles with hollow structures and $SiO_2.nH_2O$ mesoporous materials with hollow structures. Since they have low density, a large BET surface area, are light weight and have an adjustable pore size distribution, the materials can be widely used in many fields, such as the preparation of nanocatalyst, separation technique, oriented polymerization, optical materials, wave absorbing materials, magnetic materials, nanometer technique of organic pigments, templating agents for synthesis of one or zero dimension materials, ceramic materials, hydrogen storage materials, controlled-release materials and medical treatments.

The present invention will be further illustrated by the following examples which are not intended to limit the scope of the invention.

EXAMPLE 1

Aqueous suspension (10 L) containing 20 wt % calcium carbonate with a particle size of about 0.2 μm and 1 mol/L sodium silicate solution (5 L) were placed in a reaction vessel. At the temperature of 30° C. under vigorous stirring, $CO_2$ gas is introduced and the pH was acidified to 7.0. The mixture was aged for 4 h at 40° C. until silicon was completely precipitated from the solution. After the composite precipitation was filtered, washed with deionized water, and dried in the oven at 80° C., $CaCO_3/SiO_2.nH_2O$ nanocomposite particles were obtained.

EXAMPLE 2

Aqueous suspension (1 L) containing 10 wt % calcium carbonate with a particle size of 0.1 μm is placed in a reaction vessel and heated at 50° C. Then 0.05 mol/L sodium silicate solution (1 L) was added gradually into the suspension over two hours, while the system was adjusted and maintained at pH=7.0 by adding 20 wt % HCl. The reaction temperature was 50° C., and the reaction time was 6 h. The mixture was then aged for 4 hours at 30° C. The composite precipitate was filtered, washed with deionized water until no $SO_4^{2-}$ was tested with $BaCl_2$, and then dried in the oven at 80° C. to obtain $CaCO_3/SiO_2.nH_2O$ nanocomposite particles.

EXAMPLE 3

According to the operation steps in Example 1, spherical calcium carbonate nanoparticles with a diameter of 40 nm were used as template agents with the ratio of $SiO_2/CaCO_3=0.1(wt)$ to obtain $CaCO_3/SiO_2.nH_2O$ composite particles with a diameter of 42-60 nm. The prepared composite particles were calcinated for 24 h at 700° C., and then cooled. The system was adjusted to maintain a pH=1 for 10 h by adding 0.1M HCl into solution. The mixture was then filtered, washed with deionized water until pH neutrality was reached, and then dried at 120° C. to obtain silica hollow sphere with a wall thickness of 2-10 nm and an inner diameter of about 40 nm. The BET surface area was about 780 m²/g.

According to the operation steps in Example 2, Example 3 was repeated and the same results were obtained.

EXAMPLE 4

According to operation steps in Example 1, needle-like calcium carbonate with a diameter of about 20 nm and a length of about 150 nm were used as template agents with the ratio of $SiO_2/CaCO_3=0.1(wt)$ to obtain $CaCO_3/SiO_2.nH_2O$ composite particles with length to diameter ratio of 5. The prepared composite particles were calcinated for 24 h at 800° C., thereafter cooled and put into 0.1M HCl solution to maintain pH=0.5 for 10 h. The mixture was then filtered, washed with deionized water until pH neutrality was reached, and dried at 110° C. to obtain tubular hollow silica materials with an inner diameter of about 20 nm.

According to the operation steps in Example 2, Example 4 was repeated and the same results were obtained.

EXAMPLE 5

An aqueous suspension containing 10 wt % calcium carbonate with a particle size of about 40 nm was added into a reaction vessel. 7 wt % Cetyl trimethyl ammonium bromide (calculated by calcium carbonate) was added as template, and a desired amount of aqueous ammonia was added to maintain the pH of the mixture at about 11.5. After TEOS (the weight ratio of $SiO_2/CaCO_3=15$) was added, the reaction system was kept at 90° C. for 7 h. Then the mixture was filtered, dried, calcinated at 550° C. for 30 h, cooled, and then kept in an acetic acid solution (0.1M) for 10 h to remove calcium oxide or calcium carbonate, then washed with deionized water until a pH=5-8 was reached to obtain silica mesoporous materials with a hollow structure, which have a wall thickness of 2-10 nm, an inner diameter of about 40 nm, an average pore diameter of 4 nm, narrow pore size distribution and a BET surface area of about 1150 m²/g.

While the present invention has been illustrated by the description of embodiments and examples thereof, and while the embodiments and examples have been described in considerable detail, it is not intended to restrict or in any way limit the scope of the appended claims to such detail. Additional advantages and modifications will be readily apparent to those skilled in the art. The invention in its broader aspects is therefore not limited to the specific details, representative methods and structures, and illustrated examples shown and described. Accordingly, numerous alternative embodiments will be apparent to those skilled in the art without departing from the scope or spirit of the general inventive concept.

What is claimed is:

1. A mesoporous $CaCO_3/SiO_2.nH_2O$ nanocomposite particle with a core-shell structure comprising a template core and a mesoporous coating layer, wherein the template core comprises $CaCO_3$, and the coating layer comprises $SiO_2.nH_2O$, where n=0-2.

2. The mesoporous $CaCO_3/SiO_2.nH_2O$ nanocomposite particle according to claim 1 having a shape selected from the group consisting of needle, spherical, cubic, spindle, chain, laminar, petal, and fiber.

3. The mesoporous $CaCO_3/SiO_2.nH_2O$ nanocomposite particle according to claim 1 wherein the shape of the mesoporous nanocomposite particle is the shape of the template core.

4. A method of preparing mesoporous $CaCO_3/SiO_2.nH_2O$ nanocomposite particles with core-shell structures, each nanocomposite particle comprising a template core and a mesoporous coating layer, wherein the template core comprises $CaCO_3$, the coating layer comprises $SiO_2.nH_2O$, where n=0-2, the method comprising:

a) creating a reaction mixture by mixing an aqueous suspension of said calcium carbonate with (i) a templating agent and (ii) an aqueous solution containing either silicon or an organic compound containing silicon;
b) continuously stirring the reaction mixture for a first period of time while maintaining the mixture at a temperature and pH operable to completely precipitate silicon out of the reaction mixture;
c) aging the reaction mixture for a second period of time; and
d) filtering, washing, and drying the aged reaction mixture to obtain mesoporous $CaCO_3/SiO_2 \cdot nH_2O$ nanocomposite particles with a mesoporous $SiO_2 \cdot nH_2O$ coating layer.

5. The method according to claim 4, wherein the template agent is selected from the group consisting of a long-chain alkyl quaternary ammonium salt type cationic surfactant with low molecular weight selected from the group consisting of $C_nH_{2n+1}NMe_3X$ wherein n=10-22 and X is selected from the group consisting of $Br^-$, $Cl^-$ and $OH^-$, a surfactant with multi-function groups including $NH_2(CH_2)_nNH_2$ wherein n=10-22, a surfactant with high molecular weight including PEO-PPO-PEO, a nonionic Gemini surfactant, and mixtures thereof.

6. The method according to claim 4, wherein the calcium carbonate includes ordinary calcium carbonate with a particle size greater than 5 μm.

7. The method according to claim 4, wherein the calcium carbonate includes ordinary calcium carbonate with a particle size between greater than 1 μm and less than or equal to 5 μm.

8. The method according to claim 4, wherein the calcium carbonate includes superfine calcium carbonate with a particle size between greater than 0.1 μm and less than or equal to 1 μm.

9. The method according to claim 4, wherein the calcium carbonate includes nanometer calcium carbonate with a particle size of 0.1 μm or less.

10. The method according to claim 4, wherein the shape of the calcium carbonate is selected from the group consisting of needle, spherical, cubic, spindle, petal, chain, laminar, and fiber.

11. The method according to claim 4, wherein the solution containing silicon is a water soluble silicate which can hydrolyze into silica, the water soluble silicate selected from the group consisting of $Na_2SiO_3$, $K_2SiO_3$, an organosilicon, and ethyl orthosilicate (TEOS).

12. The method according to claim 4, wherein the temperature of the reaction mixture is 10-200° C.

13. The method according to claim 4, wherein the pH value of the reaction mixture is 5-12.

14. The method according to claim 4, wherein the first period of time is 0.1-8 h, and the second period of time is 0-6 h.

15. The method according to claim 4, wherein the reaction mixture is created by first mixing the template agent with the aqueous solution containing either silicon or the organic compound containing silicon, and the aqueous suspension of calcium carbonate is added to the first mixture.

\* \* \* \* \*